(12) United States Patent
Khojastepour et al.

(10) Patent No.: US 8,923,907 B2
(45) Date of Patent: Dec. 30, 2014

(54) SCALABLE NETWORK MIMO FOR WIRELESS NETWORKS

(71) Applicant: NEC Laboratories America, Inc., Princeton, NJ (US)

(72) Inventors: Mohammad A. Khojastepour, Lawrenceville, NJ (US); Xinyu Zhang, Madison, WI (US); Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 203 days.

(21) Appl. No.: 13/755,485

(22) Filed: Jan. 31, 2013

(65) Prior Publication Data

US 2013/0237265 A1    Sep. 12, 2013

Related U.S. Application Data

(60) Provisional application No. 61/608,381, filed on Mar. 8, 2012.

(51) Int. Cl.
| | | |
|---|---|---|
| *H04W 68/00* | (2009.01) | |
| *H04W 4/00* | (2009.01) | |
| *H04W 74/00* | (2009.01) | |
| *H04W 72/08* | (2009.01) | |
| *H04L 1/00* | (2006.01) | |
| *H04L 1/06* | (2006.01) | |
| *H04B 7/02* | (2006.01) | |
| *H04W 74/08* | (2009.01) | |
| *H04B 7/04* | (2006.01) | |

(52) U.S. Cl.
CPC .......... *H04W 74/00* (2013.01); *H04W 72/082* (2013.01); *H04L 1/0015* (2013.01); *H04L 1/0026* (2013.01); *H04L 1/06* (2013.01); *H04B 7/024* (2013.01); *H04W 74/08* (2013.01); *H04B 7/0452* (2013.01)
USPC ........ 455/515; 455/452.1; 455/509; 455/63.1

(58) Field of Classification Search
USPC .......... 455/452.1, 509, 515, 434, 67.11, 63.1, 455/501, 67.13, 452.2; 370/329, 352, 315
See application file for complete search history.

(56) References Cited

U.S. PATENT DOCUMENTS

2002/0181423 A1* 12/2002 Chen et al. .................... 370/337
2006/0045034 A1* 3/2006 Kwon et al. ................... 370/310

(Continued)

OTHER PUBLICATIONS

Aryafar, E., et al. "Design and Experimental Evaluation of Multi-User Beamforming in Wireless LANS" Proceedings of the 16th Annual International Conference on Mobile Computing and Networking, MOBICOM 2010. Sep. 2010. (12 Pages).

(Continued)

*Primary Examiner* — John J Lee
(74) *Attorney, Agent, or Firm* — Akitaka Kimura; Joseph Kolodka (57) ABSTRACT

Systems and methods for system for channel access adaptation are disclosed. One system includes a plurality of remote antennas and a plurality of access points. The remote antennas transmit data to receivers and obtain channel state information. Additionally, each access point controls a different cluster of the remote antennas and receives the respective channel state information from the remote antennas of the cluster. Further, each access point is configured to, independently from other access points, adapt channel allocations to the remote antennas of the respective cluster based on a tracking of sums of collision loss probabilities. Each given sum is determined by the access point for a different given set of a plurality of sets of cooperating remote antennas in the respective cluster, where each constituent collision loss probability in the given sum is determined by the access point from a different interference clique to which the given set belongs.

20 Claims, 3 Drawing Sheets

(56) References Cited

U.S. PATENT DOCUMENTS

2009/0154485 A1* 6/2009 Park et al. ............... 370/438
2014/0219162 A1* 8/2014 Eyuboglu et al. ......... 370/315

OTHER PUBLICATIONS

Gesbert, D., et al. "Multi-Cell MIMO Cooperative Networks: A New Look at Interference" IEEE Journal on Selected Areas in Communications, vol. 28, No. 9. Dec. 2010. pp. 1380-1408.

Gollakota, S., et al. "Interference Alignment and Cancellation" Proceedings of the ACM SIGCOMM 2009 Conference on Applications, Technologies, Architectures, and Protocols for Computer Communications. Aug. 2009. (12 Pages).

Lin, K., et al. "Random Access Heterogeneous MIMO Networks" Proceedings of the ACM SIGCOMM 2011 Conference on Applications, Technologies, Architectures, and Protocols for Computer Communications. Aug. 2011. (12 Pages).

Rahul, H., et al. "Sourcesync: A Distributed Wireless Architecture for Exploiting Sender Diversity" Proceedings of the ACM SIGCOMM 2010 Conference on Applications, Technologies, Architectures, and Protocols for Computer Communications. Sep. 2010. pp. 171-182.

Tan, K., et al. "SAM: Enabling Practical Spatial Multiple Access in Wireless LAN" Proceedings of the 15th Annual International Conference on Mobile Computing and Networking, MOBICOM 2009. Sep. 2009. (12 Pages).

* cited by examiner

SCALABLE NETWORK MIMO FOR WIRELESS NETWORKS

RELATED APPLICATION INFORMATION

This application claims priority to provisional application Ser. No. 61/608,381 filed on Mar. 8, 2012, incorporated herein by reference.

BACKGROUND

1. Technical Field

The present invention relates to wireless communication methods and systems and, more particularly, to network multiple input multiple output (MIMO) systems and methods.

2. Description of the Related Art

Network MIMO (netMIMO) is a family of techniques that has the potential to enhance the capacity of wireless systems via tight coordination between access points (APs), thus enabling them to serve multiple users concurrently. Numerous existing schemes, traditionally used in multi-user MIMO systems, have been applied to establish netMIMO by integrating distributed APs into one giant-MIMO. Several works have looked into the design of efficient multi-user MIMO (single cell and netMIMO multiple cells/links) transmission schemes in the physical layer that have been adopted in next generation standards, such as 802.11 ac and CoMP (Coordinated Multi-Point) in LTE (Long Term Evolution). There have also been several practical realizations of such MU-MIMO and netMIMO schemes in the networking community that showcase their real-world performance. Existing works have focused on the realization of the netMIMO scheme itself and hence only considered small scale topologies where channel state information is shared amongst all transmitters.

SUMMARY

One embodiment of the present principles is directed to a system for channel access adaptation. The system includes a plurality of remote antennas and a plurality of access points. The remote antennas are configured to transmit data to receivers and to obtain channel state information. In addition, each of the access points is configured to control a different cluster of the remote antennas and receive the respective channel state information from the remote antennas of the respective cluster. Further, each of the access points is configured to, independently from other access points, adapt channel allocations to the remote antennas of the respective cluster based on a tracking of sums of collision loss probabilities. Each given sum is determined by the corresponding access point for a different given set of a plurality of sets of cooperating remote antennas in the respective cluster, where each constituent collision loss probability in the given sum is determined by the corresponding access point from a different corresponding interference clique to which the given set belongs.

Another embodiment is also directed to a system for channel access adaptation. The system comprises a cluster of remote antennas and an access point. The remote antennas are configured to transmit data to receivers and to obtain channel state information. Further, the access point is configured to receive the channel state information from the remote antennas and adapt channel allocations to the remote antennas based on a tracking of sums of collision loss probabilities. Each given sum is determined by the access point for a different given set of a plurality of sets of cooperating remote antennas in the cluster, where each constituent collision loss probability in the given sum is determined by the access point from a different corresponding interference clique to which the given set belongs.

Another embodiment is directed to a method for channel access adaptation. In accordance with the method, channel state information is received from a cluster of remote antennas. Further, channel allocations for the remote antennas of the cluster are determined based on a tracking of sums of collision loss probabilities. Each given sum is determined for a different given set of a plurality of sets of cooperating remote antennas in the cluster, where each constituent collision loss probability in the given sum is determined from a different corresponding interference clique to which the given set belongs. In addition, data from at least one of said sets of cooperating remote antennas in the cluster is transmitted in accordance with the channel allocations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Several existing network MIMO schemes are limited to small-scale networks due to a stringent synchronization requirement and the overhead in sharing data signals between APs. A straight-forward approach of directly porting these solutions to large networks would not be feasible (scalable) in terms of synchronization and overhead. Further, lack of data sharing would also limit performance scalability. On the other hand, restricting netMIMO to a small set of transmitters, albeit feasible, would compromise the netMIMO gains due to interference from non-cooperating transmitters. Achieving scalability in terms of both performance and feasibility, in turn, involves striking an efficient balance between these conflicting objectives.

The notion of addressing interference in wireless networks has changed considerably with the advent of MIMO. While interference was traditionally resolved through collision avoidance mechanisms initially, as in, for example, carrier sense multiple access schemes (CSMA), the spatial degrees of freedom (DoFs) in MIMO permit for interference to not just be suppressed but also exploited. Interference between links that was traditionally resolved through collision-avoidance mechanisms can now be suppressed or even exploited in MIMO by enabling the interfering links to cooperate and share interference information, including channel state information and data. Such mechanisms are often collectively referred to as network MIMO, multi-user MIMO (MU-MIMO), and CoMP transmissions.

Sharing channel state information alone can only help suppress interference between links, whereby the number of concurrent transmissions will scale only with the number of antennas on a link. However, sharing of data as well will enable interference to be exploited and converted into a cooperation gain, for example reception at a receiver from multiple transmitters, thereby permitting performance to scale with the number of transmitters. The benefits of network MIMO are realized at the cost of interference information exchange, for example, on the backhaul, as well as synchronization between the cooperating transmitters, as tighter phase synchronization is needed for data sharing.

Exemplary embodiments described herein below employ NEMOx, a novel architecture that realizes the netMIMO gain in large-scale wireless networks. NEMOx organizes a network into multiple clusters, each including one AP and multiple cooperating points (CPs)—each being a remote antenna—that are fully synchronized at the AP. NEMOx manages inter-cluster interference using a decentralized channel-access algorithm that opportunistically groups the CPs for cooperation, while leaving sufficient room for spatial reuse between clusters. Within each cluster, NEMOx optimizes the set of clients to serve, and the power allocation from CPs to the clients, in order to maximize the netMIMO gain while ensuring fairness among them. It can be shown that NEMOx delivers multiple folds of capacity gain compared to distributed networks without MIMO cooperation. It can also be shown that NEMOx incurs limited inter-cluster contention overhead and that its capacity scales well with the number of clusters and with the number of CPs within each cluster.

Exemplary embodiments described herein provide a framework that enables an efficient partition of the transmission points into several clusters where (i) inside each cluster the transmission strategy is fully synchronized and there is a central decision making process for the physical layer and media access control (MAC) layer problems such as beamforming, precoding, power control and scheduling, while (ii) between the clusters there is no coordination and the transmission strategy is fully decentralized. Further, the embodiments have relatively low overhead. For example, local information is exchanged within a cluster and hence has lower overhead and cost associated with it in comparison to a full scale version of NetMIMO proposals. Moreover, the embodiments described herein can easily scale with an increase in the number of remote antennas or transmission points. In addition, the embodiments provide an ease of synchronization. For example, since all the transmission points within a cluster are in fact connected directly to a central access point or base station they can share the same clock and be fully synchronized (up to a symbol level). Although the problem of Medium Access Control is much harder to address with the use of multiple transmission points, the exemplary embodiments of the present principles described herein apply an intelligent MAC scheme that reduces the interference caused to the neighboring clusters or cells while enhancing the cooperation among the transmission points or antennas inside a cluster. The exemplary MAC scheme described herein also considered fairness among all transmission points irrespective of the clusters to which they are assigned.

There are several important features of the exemplary embodiments described herein below. For example, the structure of the transmission scheme uses a clustering approach with centralized control in each cluster and decentralized control between different clusters. Also, remote antenna head ends can be used for each transmission point instead of full access points to permit a simpler and low-cost deployment as well as to make the synchronization readily possible between the transmission points inside a cluster. The physical transmission strategy comprises precoding, power allocation and user selections. In accordance with exemplary aspects of the present principles, a plurality of transmission strategies can be used. For example, one strategy provides an optimal scheme that involves solving an optimization problem. Another strategy employs simple precoder generation and intelligent power control for a selected user which has low complexity and provides near optimal performance. Here, the AP uses an algorithm to assign the CPs in the set to clients with downlink packets. The assignment problem can involve several coupled factors: (i) The number of clients should not exceed the number of CPs in the cooperating set; (ii) A client's achievable rate depends on not just its own channel gain, but also peers in the same set; (iii) The power budget of each CP should be spent intelligently such that sufficient "cancellation power" is used to eliminate the inter-stream interference, and the remaining power ensures efficient and fair rate allocation among clients. Furthermore, the MAC design described herein below enables independent and decentralized channel access adaptations within each cluster in a way that optimizes the utility of the system.

It should be understood that embodiments described herein may be entirely hardware or may include both hardware and software elements, which includes but is not limited to firmware, resident software, microcode, etc. In a preferred embodiment, the present invention is implemented in hardware and software.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As indicated above, no coordination or synchronization between clusters is required for scalability in the exemplary embodiments described herein. Thus, the channel-access mechanism should be asynchronous and decentralized in nature. Random access mechanisms provide a light-weight approach to achieving this goal. Although their asynchronous access cannot provide any cooperation gain, they enable clusters to infer and react to interference via avoidance, while permitting for spatial reuse—a key factor for scalable network-wide performance. The resolution of contention (collision) in random access mechanisms are traditionally addressed through two approaches: persistence and backoff. While access to the medium is controlled by a probabilistic parameter in persistence-based access, it is the backoff window that is probabilistically adapted in backoff-based access. In either case, the contention parameter is adapted to ensure the desired efficiency and fairness properties. Since forward-engineering MAC protocols with provable performance and fairness guarantees for backoff-based schemes are difficult to realize in practice, the exemplary embodiments described herein below are based on persistence.

In conventional persistence-based MAC schemes for omnidirectional antenna networks, fairness and access (contention) are associated with an individual node (CP). In accordance with the exemplary embodiments described herein, a CP can cooperate with different sets of CPs (within a cluster). Hence, channel access and contention are coupled across multiple CPs which may, unfortunately, have an inconsistent view of the channel status. CPs can realize MIMO cooperation only when all of their transmission attempts are synchronized (i.e., they sense an idle channel and finish backoff at the same time). A straightforward approach is to wait for the opportunity when all CPs are available. However, such a strict binding of CPs can severely hinder spatial reuse, and provide only marginal gains over CSMA, although multiplexing gain is maximally exploited. Alternatively, CPs may access the channel independently using a conventional MAC scheme (e.g., CSMA) and opportunistically form groups with each other when they are available. However, due to the asynchronous nature of channel access, such multiplexing opportunities are rare, thereby diminishing the gains from netMIMO.

Figure 1:
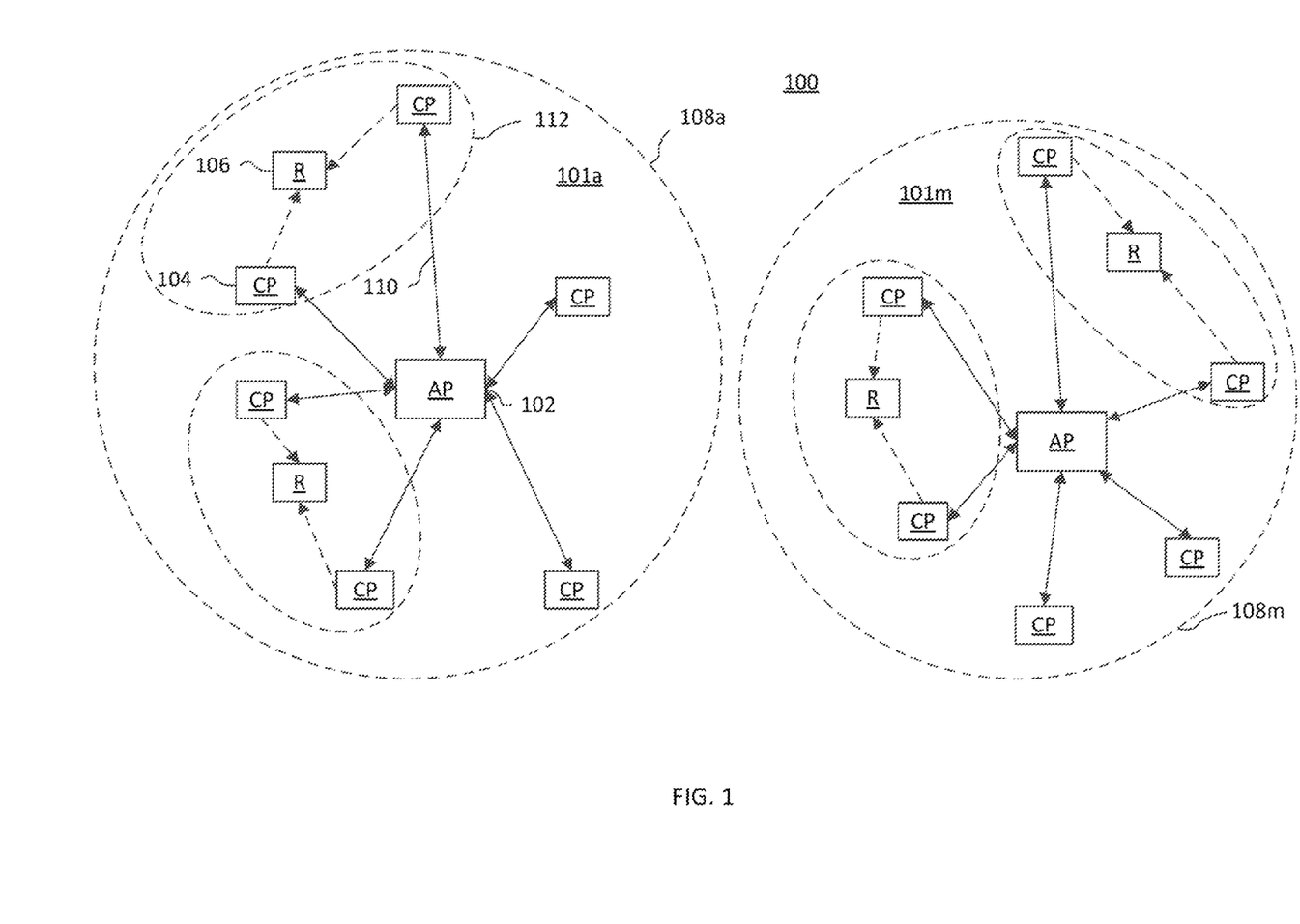
FIG. 1 is a high-level block diagram of a network MIMO system in accordance with an exemplary embodiment.

Exemplary embodiments described herein meet the above-described challenge by grouping the CPs within each cluster into multiple cooperating sets. For example, referring now to the drawings in which like numerals represent the same or similar elements and initially to FIG. 1, an exemplary communication system 100 in which embodiments of the present principles can be implemented is illustratively depicted. The system 100 includes a plurality of access points 102, each of which services a different cluster 108a and 108m of CPs or remote antennas 106 in respective systems 101a and 101m. Although two clusters 108a and 108m and two corresponding APs 102 are shown for illustrative purposes, a particularly advantageous aspect of the principles described herein is that the system 100 is scalable and can include many more clusters of remote antennas and corresponding access points that control them. Each CP can transmit channel state information received from receivers 106 along a backhaul 110 and can in turn receive data for transmission to the receiver(s) 106 it services from the AP 102 through the backhaul 110. Moreover, as discussed herein below, a receiver 106 can receive the same data from a set 112 of cooperating remote antennas 104 to implement cooperation gains that are achievable with Net-MIMO. As illustrated in FIG. 1, the system 100 can include a plurality of cooperating sets 112.

Figure 2:
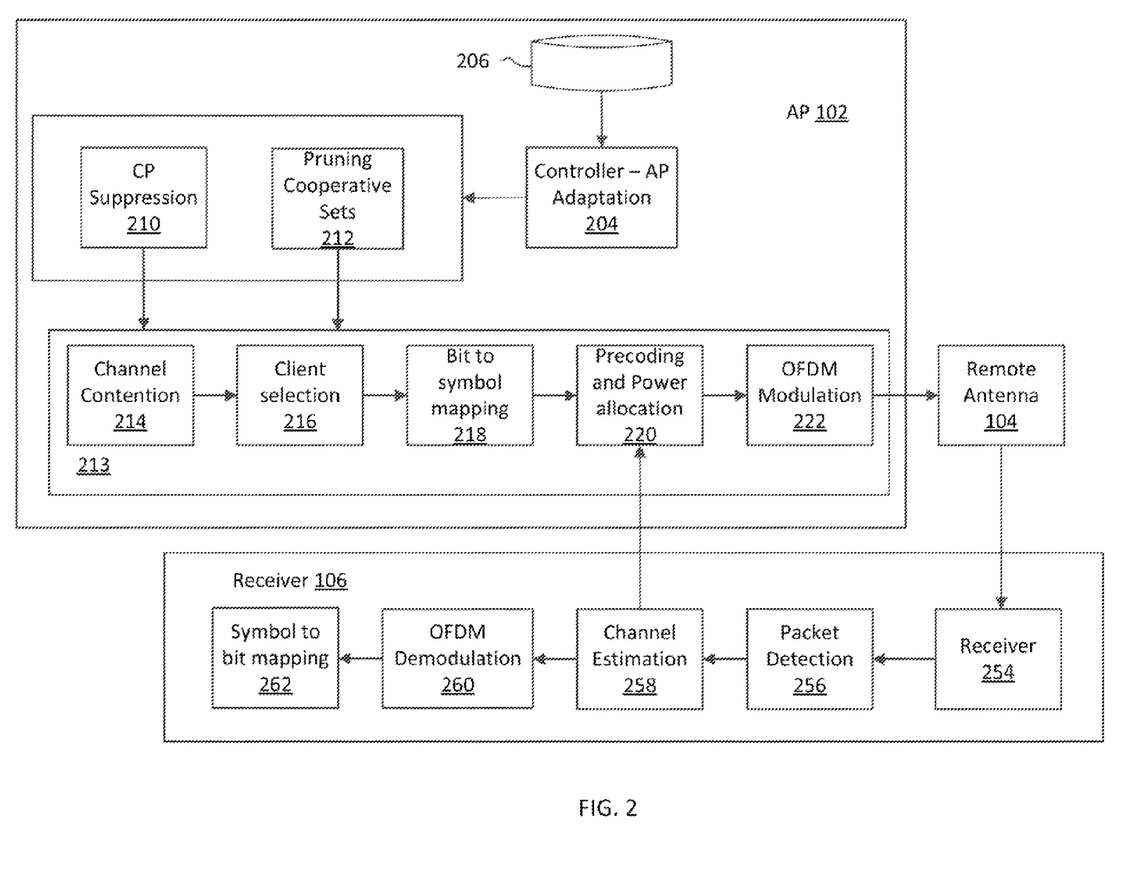
FIG. 2 is a high-level block/flow diagram of various components of a network MIMO system in accordance with an exemplary embodiment.

FIG. 2 provides a more detailed depiction of the access points 102 and receivers 106. The AP 102 can include a controller 204 that can be configured to perform channel access adaption in accordance with the methods described herein below. In accordance with one embodiment, the controller 204 can be configured to execute a program of instructions stored on a storage medium 206 to implement the adaptation. The AP system 102 can further include CP suppression and pruning modules 210 and 212 respectively. Further, the system can comprise a transmission module 213, which can include a client contention director module 214, a client selection module 216, a bit to symbol mapper 218, a precoding and power allocation module 220 and an Orthogonal Frequency-Division Multiplexing (OFDM) modulator 222. The transmission module 213 can communicate data to the remote antenna 104 for transmission to receivers 106. The functions of the various elements of the AP 102 are described in more detail herein below.

The receiver can include a receiver antenna 254 for receiving data from remote antennas 104, a packet detection module 256, a channel estimation module 258, an OFDM demodulator 260 and a symbol to bit mapping module 262. The channel estimation module 258 can be configured to obtain interference measurements for channel resources and can determine channel state information based on the interference measurements. The channel state information can be fed back to the controller 204 and the precoding and power allocation module 220 through the receiver antenna 254 and the remote antenna 104.

Referring again to FIG. 1, the cooperating sets 112 contend for channel access with each other, and with cooperating sets in neighboring clusters, and a winning set in a cluster permits all its CPs to transmit synchronously. Channel-access attempts of each set are managed by a distributed network utility maximization (NUM) framework, which optimizes the efficiency while ensuring proportional fair access for all CPs.

Note that in network MIMO, a client can 106 jointly receive data from multiple CPs. Hence, unlike in existing schemes, where fairness can be defined with respect to a link (Tx-Rx pair) and hence a client, such a notion does not exist in network MIMO, where a client's rate depends not only on its cooperating set of transmitters but also on the other clients to whom the joint transmission is made. Hence, fairness in access is defined herein below with respect to each CP, while the fairness with respect to clients is addressed during the netMIMO operation once channel access is obtained. Thus, we associate a utility function $U(r_i)$ for each CP, $c_i$, where $r_i$ is the rate received by it and $U(\cdot)$ is a non-negative, concave, differentiable function. The choice of the utility function determines the nature of fairness model achieved. The MAC design can be forward-engineered through the following optimization.

$$NCA: \text{Maximize} \sum_{C_m \in C} \sum_{i \in C_m} \alpha_m U(r_i)$$

$$\sum_{j:S_j \in M_k} q_j \leq 1; \forall M_k \in \mathcal{M}$$

$$\text{where } r_i = \sum_{j:i \in S_j} (1 - P_j) q_j$$

where C denotes the set of clusters; $\alpha_m$ is the weight used for prioritizing cluster $C_m$; $q_j$ represents the channel-access probability for each cooperating set $S_j$ whose collision (contention with sets in same and other clusters) loss probability is $P_j$. In omnidirectional communication, interference is captured through the notion of maximal cliques, where all nodes in the clique collide with each other. Equivalently in network MIMO, we define maximal cliques ($M_k$) with respect to cooperating sets ($S_j$), where a cooperating set collides with another if at least one of the joint transmissions in the other set suffers interference above a certain threshold. For example, the interference can be measured as a signal to interference plus noise ratio (SINR) such that if the SINR is below a certain threshold, then the corresponding set is deemed part of the maximal clique. Note that one of the implicit clique constraints is that $\Sigma_{j:S_j \in S_m} q_j \le 1$, i.e. only one set can be chosen in each cluster where $S_m$ captures all the cooperating sets in cluster m. The constraint to the optimization problem is that the net access probability in each maximal clique should be bounded by one to avoid collision. The resulting rate of each CP would be a function of all the cooperating sets it belongs to as well as their respective collision probability. The output of this optimization problem directly provides the channel-access probability for each cooperating set. While the optimization involves knowledge of the maximal cliques and collision probabilities, which can be obtained based on interference measurements obtained and communicated by receivers 106, it will now be shown that the problem can be solved in a completely decentralized manner.

Observing that NCA is a concave optimization problem, we can obtain its Lagrangian as:

$$L = \sum_{C_m \in C} \sum_{i \in C_m} \alpha_m U(r_i) - \sum_j \sum_{k: S_j \in M_k} \beta_k q_j.$$

We can write $\beta_k$ as $\beta_k = \beta_{p_k}$, where $p_k$ is the collision probability in maximal clique $M_k$. Since a cooperating set can belong to multiple maximal cliques, we have $P_j = 1 - \Pi$. If the collision in each clique is kept small, then we can approximate $P_j \approx \Sigma_{k:S_j \in M_k} p_k$. Thus, to obtain $P_j$, it is sufficient for each cooperating set to track its net loss probability, which is a function of the sum of the loss probabilities in its constituent cliques. Thus, substituting for $\beta_k$ and applying the approximation, we have $$L = \sum_{m:C_m \in C} L_m$$

$$\text{where, } L_m = \sum_{i \in C_m} \alpha_m U(r_i) - \beta \sum_{j:(i \in S_j)\&(i \in C_m)} P_j q_j$$

A game-theoretic analysis has been used to show that the aggregate utility for a system of equations of the above form is maximized when the individual components maximize their own utility. While the component corresponds to a single link in omnidirectional communication, the component corresponds to a cluster in network MIMO. Thus, joint adaptation of cooperating sets within each cluster should be used to obtain optimality.

Applying the Karush-Kuhn-Tucker (KKT) conditions for optimality with respect to each cooperating set, we obtain $$\frac{dL_m}{dq_j} = \sum_{i \in S_j} \alpha_m U'(r_i)(1 - P_j) - \beta P_j = 0, \forall S_j \in S_m \quad (1)$$

With our desired fairness model being proportional fairness, we employ a logarithmic function of the rate for our utility functions ($U(r_i) = \log(r_i)$). Thus, at the optimal solution, for every cooperating set we have $$\frac{dL_m}{dq_j} = \sum_{i \in S_j} \frac{\alpha_m(1 - P_j)}{r(i)} - \beta P_j = 0$$

$$\frac{dL_m}{dq_j} = \alpha_m(1 - P_j) - \beta P_j \left( \frac{1}{\sum_{i \in S_j} \left(\frac{1}{r_i}\right)} \right) = 0$$

While $\alpha_m$ can be used to prioritize different clusters, for an equal bias, we set $\alpha_m = \alpha$ in one embodiment. Given that $P_j$ can be locally inferred by each cooperating set $S_j$, the above optimality condition can be used to adapt its access probability in a completely decentralized manner as follows:

$$q_j \leftarrow q_j + \alpha(1 - P_j) - \beta P_j \left( \frac{1}{\sum_{i \in S_j} \left(\frac{1}{r_i}\right)} \right).$$

Such an adaptation has the following important properties.

Firstly, adaptation is performed jointly within a cluster. Unlike omnidirectional communication, where adaptations are purely link-specific, in exemplary embodiments of the present principles, the access adaptation for a cooperating set is coupled with the rate of the constituent CPs, which, in turn, is a function of all the cooperating sets that each CP belongs to—in essence, the access adaptation of a cooperating set should be performed jointly with that of other sets in the cluster to achieve optimality. In particular, the collision between cooperating sets within the same cluster can be resolved internally by the AP, instead of wasting the transmission attempt in packet collision.

Secondly, each AP converges to the solution of NCA. Although coupled, the adaptation mechanism for each cooperating set follows a gradient approach based on the KKT conditions. Further, since the utility function $U(r_i) = \log(r_i) = \log(\Sigma_{j:i \in A_j}(1 - P_j)q_j)$ and the resulting Lagrangian are concave with respect to each $q_j$, there exists a unique maximum, to which the individual adaptations can be shown to converge.

Thirdly, the scheme can be practically realized through a distributed antenna system (DAS). An important aspect in realizing optimality through the above-described adaptation is the joint adaptation of access parameters within a cluster. This in turn indicates that the collision, access and rate parameters of all cooperating sets should be shared and coordinated among each CP. However, such a MAC requirement (in addition to tight phase synchronization) is difficult to realize in practice, where distributed APs are coordinated on an ethernet backhaul to achieve network MIMO. On the other hand, by virtue of enabling cooperation between CPs at the physical layer, DAS not only permits for easier synchronization but also for coordination and joint adaptation of access parameters between cooperating sets.

Figure 3:
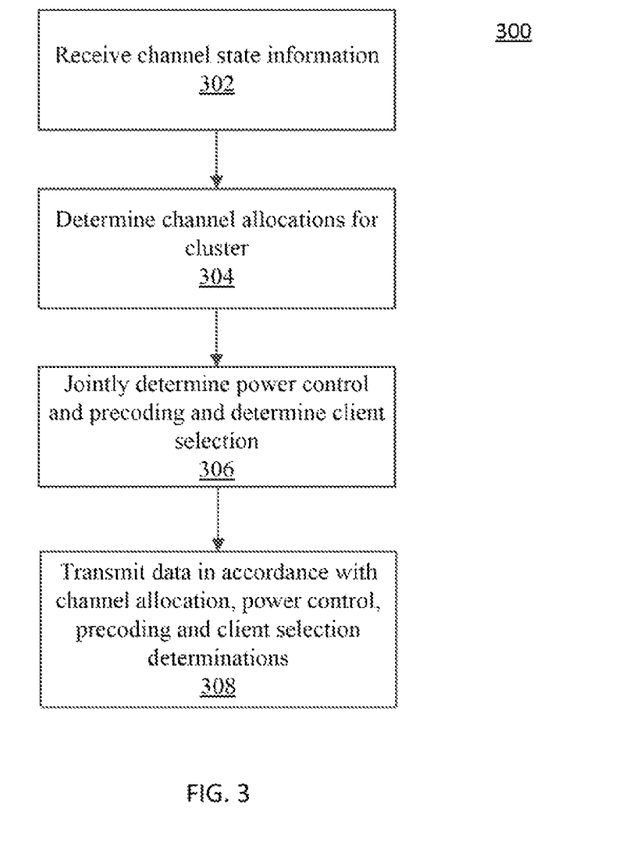
FIG. 3 is a high-level block/flow diagram of a method for channel access adaptation in accordance with an exemplary embodiment.

With reference now to FIG. 3, a diagram of an exemplary method 300 for channel access adaptation in accordance with an exemplary embodiment is illustratively depicted. The method 300 can be performed by each AP 102 of each cluster. Further, each AP 102 can perform the method 300 independently from APs of other clusters. The method can begin at step 302, at which the controller 204 of the AP 102 can receive channel state information, including interference measures, through the CPs 104 in its cluster from the receivers 106 served in its cluster. At step 304, the controller 204 and the channel contention module 214 can determine channel allocations for the remote antennas of the cluster. For example, the channel state information can be employed by the controller 204 to determine the interference cliques, for example the maximal cliques $M_k$, and the collision loss probabilities $P_j$ for corresponding sets $S_j$ 112 of cooperating remote antennas. As indicated above, each interference clique can denote a group of the sets $S_j$ 112 of cooperating remote antennas, where each set in the group either inflicts or undergoes interference from another set in the group that exceeds a threshold interference, which can be based on SINR. The maximal clique can be determined by searching all interference cliques (for example defined by a maximum SINR or a threshold SINR), finding the one which has most number of nodes included therein and selecting this clique with the most number of nodes as the maximal clique. Alternatively, a suboptimal approach, for example, based on greedy search, can be used to determine a maximal clique. As also indicated above, the controller 204 can compute $P_j$ for a set $S_j$ 112 by tracking a net loss probability by determining a sum of the loss probabilities of the set in its constituent cliques, i.e. by summing each constituent collision loss probability from a different corresponding interference clique to which the set $S_j$ 112 belongs. The collision loss probability may be determined for example by time averaging the number of collisions. Accordingly, the controller 204, along with the channel contention module 214, as discussed below, can adapt channel allocations to the remote antennas 104 of the cluster of its AP based on a tracking of the sums of collision loss probabilities of the sets $S_j$ 112, where each sum is determined for a different given set $S_j$ in the cluster. Thereafter, the controller 204 and the channel contention module 214 can determine a corresponding channel access probability $q_j$ for each of the sets of cooperating remote antennas in the cluster of the access point based on $P_j$ for purposes of performing or adapting channel or channel resource allocation.

Figure 4:
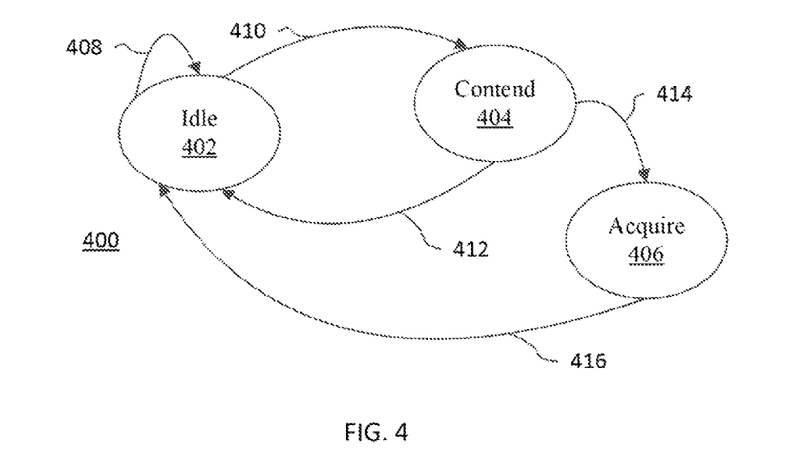
FIG. 4 is a state diagram for a given set of cooperating antennas illustrating an adaptation for the set.

For example, referring now to FIG. 4, with continuing reference to FIG. 3, the cluster AP 102, at step 304, runs the adaptation for each of its cooperating sets. FIG. 4 provides a state diagram 400 for a given set $S_j$ 112 of cooperating antennas 104 illustrating the adaptation for the set. The channel contention module 214 can select one of the sets 112 of cooperating remote antennas in the cluster to transmit data, on a channel resource, to one or more receivers 106 that is served by the set based on updates of the channel access probabilities of the sets 112 in the cluster. For example, a given set can be in one of three states: Idle 402, Contend 404 and Acquire 406. When all CPs in a set $S_j$ senses an idle channel or channel resource for a short duration (for example, the DIFS time defined in 802.11), $S_j$ enters the idle state 402 for the channel resource. Here, along line 408, the channel contention module 214 determines whether $\epsilon_j > q_j$, where $\epsilon_j$ is a random number between 0 and 1. If not, then channel contention module 214 updates $q_j$ by incrementing it as follows: $q_j += \alpha$. In addition, the determination of whether $\epsilon_j > q_j$ is repeated. If $\epsilon_j > q_j$, then the channel contention module 214 directs the CPs 104 of the set $S_j$ to make a contention attempt with probability $q_j$ along line 410 and to enter the contention state 404. Here, the contention attempt is a designation of the set $S_j$ as being in the contention state; the set $S_j$ need not attempt to access a channel resource in the contention state. Since $\Sigma_{j:S_j \in S_m} q_j \leq 1$ in each cluster, the channel contention module 214 picks a local winning set with a highest probability $q_j$. The winning set then, along line 414, enables netMIMO transmission among all its CPs. Here, the channel contention module 214 updates $q_i$ by incrementing $q_j$: $q_j = \alpha$ and the winning set enters the acquire state 406, where it acquires the channel resource(s) to perform the netMIMO transmission. Thereafter, the channel contention module 214 directs the winning set to enter the idle state 402 along line 416. While the contention (loss) of a winning set with sets in other clusters has to be inferred through packet collisions, this is not required for local contention loss between sets in the same cluster that can be inferred directly by the AP. The transmission operation can also be preceded by a random backoff window (0, B), where B is a constant (window size), to increase efficiency by reducing the impact of collisions. If there is a contention loss (happens with probability $P_j q_j$), the channel contention module 214 decrements the access probability by $$\frac{\beta}{q_j} \left( \frac{1}{\sum_{i \in S_j} \left(\frac{1}{r_i}\right)} \right) - \alpha$$

while it increments the access probability by $\alpha$ on a successful transmission. Thus, returning to state 404, if any set $S_j$ does not win the contention, then the channel contention module 214 directs that set $S_j$ to enter the idle state 402 along line 412 and updates its probability $q_j$:

$$q_j += \alpha - \frac{1}{q_j} \left( \beta \left( \sum_{i \in S_j} \frac{1}{r_j} \right)^{-1} + \alpha \right).$$

While there are multiple ways to realize $$q_j \leftarrow q_j + \alpha(1 - P_j) - \beta P_j \left( \frac{1}{\sum_{i \in S_j} \left(\frac{1}{r_i}\right)} \right)$$

by distributing the adaptation between different states, the preferred embodiment realizes it as in FIG. 4, where the increment of $q_j$ in the idle mode was found to contribute to faster convergence.

In each cluster, the number of cooperating sets increases exponentially with the number of CPs. However, not all cooperating sets contribute equally to the cluster's capacity. The pruning module 212 discriminates them by defining a dominance relation. A cooperating set $S_i$ is said to dominate Sj within the same cluster if $S_j$'s CPs is a subset of $S_i$'s, and $S_i$'s interfering CPs in neighboring clusters is a subset of Sj's. Assuming the carrier sensing relation between CPs to be symmetric, then equivalently, $S_i$ should have similar access probability (and causes similar interference to competing sets) with Sj but it has a higher multiplexing gain by enabling more concurrent transmissions. Hence, the pruning module 212 eliminates the dominated set $S_j$ to achieve a higher efficiency. Each CP learns the set of interfering CPs in the cluster through carrier sensing, and the pruning module 212 of the cluster AP periodically checks the dominance relation between all cooperating sets, and then prunes the dominated ones. While the distributed NUM framework would automatically discriminate such dominated sets, it would still need to allow those sets to contend for channel access (by increasing $\alpha$) and then converge back to low contention probability, whose associated overhead is eliminated by the pruning process.

At step 306, as described herein below, the client selection module 216 can perform client selection and the precoding and power allocation module 220 can jointly determine precoding and power control for one or more sets Sj selected at step 304. At step 308, the controller 204 can direct the remote antennas 104 to transmit data to the receivers in accordance with the channel allocations determined at step 304 and with the client selection, precoding and power control determined at step 306.

As indicated above, optimizing the scheme within each cluster at step 306 involves two components: joint power control, client selection and precoding for scalable netMIMO performance; and CP suppression for creating reuse opportunities across clusters. The first component is encountered after a cooperating set wins the access opportunity. Here, the AP employs an algorithm to assign the CPs in the set to clients with downlink packets. The assignment problem involves several coupled factors: (i) The number of clients should not exceed the number of CPs in the cooperating set; (ii) A client's achievable rate depends on not just its own channel gain, but also peers in the same set; (iii) The power budget of each CP should be spent intelligently, such that sufficient "cancellation power" is used to eliminate the inter-stream interference, and the remaining power ensures efficient and fair rate allocation among clients. The system can meet these specifications by jointly allocating CP power, designing the precoding matrix, and selecting the set of downlink clients. First, the power allocation and precoding problem for the case when the number of clients are already selected is considered. Then how client selection can be incorporated jointly will be described.

When the number of clients is no more than the number of CPs, one approach for MU-MIMO down-link transmission is zero-forcing beamforming, i.e., using the pseudo-inverse of the channel matrix directly as the precoding matrix: v=h' (hh')$^{-1}$. Suppose $v_{ki}$ are elements of the precoding matrix v, denoting the precoding weight of the k-th CP for i-th client (stream). Since hv=I (unity matrix), each client only receives the data intended for itself, while other streams are nullified after precoding and channel distortion.

In CAS (Co-located Antenna Systems), antenna power allocation can be separated from the design of the precoding matrix. A practical approach allocates an equal amount of power for all clients (streams) by normalizing each CP's power budget with the maximum magnitude of the precoding vectors of all CPs:

$$A_i^2 = \max_{j \in S} \frac{P}{\sum_{k=1}^{|D|} |v_{kj}|}.$$

This approach has been shown to be close to optimal in practical CAS but can significantly degrade the performance in a DAS set-up, especially when the topology is imbalanced. Hence, the preferred embodiment adopts a rigorous formulation for jointly designing the precoding matrix and power allocation to maximize the aggregate achievable rate, while ensuring proportional fairness among clients.

The power that a client or receiver 106 receives depends on the elements of the precoding matrix, i.e., how each CP weights the data symbols of each client. The problem can be formulated as:

$$\max \sum_{i=1}^{|D|} w_i \log\left(1 + \frac{P_i}{N_0}\right) \quad (2)$$

$$\text{s.t. } P_i = \left|\sum_{k=1}^{|S|} h_{ik} v_{ki}\right|^2, \forall i \in D \quad (3)$$

$$\sum_{k=1}^{|D|} |v_{ki}|^2 \leq P, \forall k \in S \quad (4)$$

$$\sum_{k=1}^{|S|} h_{jk} v_{ki} = 0, i \in D, j \neq i \quad (5)$$

where D and S are the set of clients and CPs, respectively, and $h_{ik}$ the complex channel gain from CP k to client i. Eq. (4) is the per-antenna power constraint. Eq. (5) represents the precoding constraint, i.e., precoded symbols intended for client i should cancel each other when arriving at client j after channel distortion (i≠j). From Eq. (5), it can be seen that when the estimated channel matrix for a client j becomes outdated (e.g., due to movement), the interference from another stream may become non-trivial, but the change only affects client j. Therefore, the channel estimation can be on-demand—the CPs may request a client to feedback its channel only if it has a low reception ratio.

In the above formulation, $w_i$ is the weight allocated to each client, and can be adjusted to achieve a certain long-term fairness objective. For proportional fairness, we can configure $w_i$ to be the inverse of the time-averaged throughput of i, i.e., for each slot of transmission attempt t, suppose client i achieves a rate of $R_i$, then we update the throughput and weight as:

$$R_{it} \leftarrow \gamma R_{i(t-1)} + (1 - \gamma) R_i \quad (6)$$

$$w_i \leftarrow \frac{1}{R_{it}} \quad (7)$$

where γ is a smoothing factor and 0<γ<1. The objective function has proven to be non-convex with respect to the real and imaginary components of the precoding weights $v_{ki}$ due to the norm operator in Eq. (3). Fortunately, by phase-shifting the vector $v_{ik}$, ∀k∈S appropriately, we can restrict Im($\sum_{k=1}^{|S|} h_{ik} v_{ik}$)=0, while both constraints (4) and (5) are invariant to the phase-shift. The resulting problem then becomes convex as long as $P_i > N_0$, and can be easily solved using standard convex optimization techniques.

When the number of clients |D| is larger than the number of CPs |S|, we should select an appropriate set of clients (maximum size |S|) so as to achieve the desired efficiency and fairness objective. A straightforward approach is to augment an indicator variable to the above optimization problem to select the optimal set of clients for each transmission attempt. However, this makes the problem intractable due to the integer and non-linear constraints. Therefore, an alternate, iterative approach for the joint design of client selection, precoding and power allocation is employed: i) First, a client that has the highest utility (resulting from the above optimization) when all available CPs are beamforming to it is elected; ii) Second, another client that results in the highest utility when grouped with the previously selected clients is selected; and iii) If the utility is lower than the previous round, or if there are no clients to be selected, stop. Otherwise, step ii) is performed.

In a DAS, the clients and CPs tend to spread over a large area, and small-scale fading (which causes small magnitude and phase variation) has little impact on the MU-MIMO capacity. Therefore, the preferred embodiment runs client selection using the channel gains in the latest transmission attempt, and then estimates the channel from available CPs to the selected set of clients to perform precoding, in order to reduce the channel estimation overhead.

The client selection can involve multiple rounds of non-linear optimization, which is inefficient when the client population is large. The bulk of the complexity is contributed by the precoding and power allocation process. Thus, a hybrid algorithm that balances the tradeoff between computational complexity and performance can be employed. It can be shown that the simple equal-power allocation suffers from severe performance degradation in an imbalanced topology. Thus, the topology imbalance is characterized using a $\rho$-factor. For a given set of CPs, the $\rho$-factor is the fairness index with respect to the number of times a CP is preferred in the set. Each client ranks the CPs according to the channel gain it sees from them, and a CP is preferred once if it is the top-rank of one of the clients. Intuitively, the $\rho$-factor reflects the imbalance of the topology. It is close to 0 when all clients are concentrated near one CP or when there are fewer number of clients than CPs, and close to 1 when they are evenly distributed among CPs (which is more likely to happen when the client population is large). Thus, the preferred embodiment adopts a hybrid power allocation scheme to strike a balance between performance and complexity, using the $\rho$-factor as a decision variable. When $\rho$ is below a threshold $\rho_0$ (we use an empirical value of 0.5), the system can employ the simple equal power allocation scheme during the client selection process, while restricting the use of the optimized power allocation scheme to highly imbalanced topologies. This permits the system to reduce complexity significantly without sacrificing in performance appreciably.

As part of the second component discussed above, CP suppression, the embodiments described herein strive to strike a balance between cooperation gain within a cluster and spatial reuse between clusters. The CP suppression module 210 of each AP in each cluster can be configured to opportunistically suppress certain CPs that: (i) contribute mainly to the diversity gain in the cluster; (ii) experience sufficient contention with adjacent clusters and (iii) cause interference to neighboring clusters' clients with downlink packets.

To evaluate the first condition, the CP suppression module 210 runs a simple stable matching algorithm. Specifically, it assigns to each client (with downlink traffic) a ranked list of "preferred CPs" based on the channel gain matrix between the CPs and the client (CPs that cannot reach the client are excluded), and to each CP a ranked list of "preferred clients." It then runs the classical stable marriage problem between the CPs and clients. CPs not in the matched set are considered to contribute little to the multiplexing gain, and will be suppressed when spatial reuse can be exploited.

To evaluate the second condition, each CP i locally computes a contention factor ($F_i$) that reflects the intensity of contention between each CP and other CPs in adjacent clusters. This is in turn defined as:

$$F_i = \sum_{j:i \in S_j} (P_j - P'_j) \quad (8)$$

where C(i) is the cluster that i belongs to. For each cooperating set $S_j$, $P_j$ and $P'_j$ denote the net collision probability and collision probability due to other sets in the same cluster respectively. Hence, $F_i$ captures the desired inter-cluster collision probability experienced by CP i. A large $F_i$ value indicates higher contention, and hence a higher potential for spatial reuse to be effectively exploited between clusters.

To evaluate the third condition, a CP estimates whether clients in neighboring clusters have traffic demand by overhearing the clear to send (CTS) packets from them. The CTS scheme used here is described in more detail herein below. If so, and if a CP i is not matched when evaluating the first condition, and if $F_i$ is larger than a threshold $\phi_i$ (we use an empirical value of 0.8), CP i would refrain from leveraging diversity gain, and leave the opportunity for clients in neighboring clusters to leverage spatial reuse instead.

To obtain the channel matrix from CPs in a cooperating set for selected clients, the 802.11ac channel estimation scheme can be used. However, the AP integrates it with a request to send (RTS)/CTS exchange that also doubles up to reduce hidden terminals. Before the transmission attempt of a cooperating set, all CPs within it synchronously broadcast an RTS packet that indicates the duration of transmission and addresses of selected clients. Then, the selected clients return a CTS packet. The header part of the CTS packet includes the transmission duration, which is sent by all clients synchronously to reserve a channel from transmitters in neighboring clusters. The second part is sent sequentially by each client (the order follows the order of addresses in the RTS), and includes the channel gain information from the CPs to clients. After completing the data transmission, an acknowledgement (ACK) is also sent sequentially by each client in a similar manner. While such an RTS/CTS/ACK scheme incurs overhead, employing it for the channel estimation procedure (important for netMIMO), amortizes its overhead. In addition, it alleviates hidden terminals, whose impact on netMIMO is more pronounced compared to single-input and single-output (SISO) communication. Further, the overhead is negligible in comparison with the netMIMO gains.

Block 213 of FIG. 2 summarizes the system's flow of operations throughout one transmission attempt. The AP periodically runs the CP suppression algorithm to exclude certain CPs from channel contention to promote reuse across clusters. The AP continuously contends for channel access, for example, by running the distributed channel access algorithm described above with respect to FIG. 4, on behalf of all the cooperating sets consisting of the remaining CPs (after the pruning operation). The cooperating set that wins contention in each cluster will start the transmission attempt immediately. It first uses the client selection algorithm described above to determine the set of clients to serve jointly through netMIMO. Then, the CPs in the winning set initiate the RTS/CTS exchange with the selected clients, estimate the corresponding channel matrix as discussed above, and the AP computes the precoding matrix along with power allocation as discussed above. It then executes the netMIMO operation with data transmission, followed by ACK reception from the clients—the latter being used to infer transmission success and update contention parameters.

As also illustrated in FIG. 2, in the transmit path, after the client-selection algorithm is run to determine the set of CPs/clients to be used for netMIMO transmissions, the digital bits of each client are mapped to symbols via, for example, binary phase shift keying (BPSK). NEMOx's joint precoding and power-allocation algorithm is then run and is performed in the frequency domain (on the symbols carried by each OFDM subcarrier). The precoded symbols for each CP are then modulated using OFDM and sent over the air.

Each client runs the receiver path that detects the packets and then estimates the channel from each CP. A packet follows a similar format with 802.11ac. It starts with a short-preamble used for self-correlation-based packet detection. Then a sequence of long preambles is sent consecutively by each CP. The long preambles are used for estimating the frequency offset between the transmitter and the receiver, as well as the channel phase/amplitude distortion to each OFDM subcarrier. These channel estimation results are fed back to the AP to perform the intra-cluster optimization of step 306. Following the long-preambles is an additional preamble sent by all CPs concurrently and used to estimate the composite channel created by channel distortion and precoding. Based on the estimation results, the receiver demodulates the OFDM symbols and decodes the digital bits therein. Within each OFDM symbol, four pilot subcarriers (with known bits), for example, can be sent by the transmitter and used for correcting residual errors in the CFO estimation using long-preambles.

Having described preferred embodiments of scalable network MIMO methods and systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for channel access adaptation, the system comprising:
    a plurality of remote antennas configured to transmit data to receivers and to obtain channel state information; and
    a plurality of access points, wherein each of the access points is configured to control a different cluster of said remote antennas, receive a respective channel state information from the remote antennas of a respective cluster and, independently from other access points of said plurality of access points, adapt channel allocations to the remote antennas of the respective cluster based on a tracking of sums of collision loss probabilities, wherein each given sum of the sums is determined by a corresponding access point for a different given set of a plurality of sets of cooperating remote antennas in the respective cluster and wherein each constituent collision loss probability in a given sum is determined by the corresponding access point from a different corresponding interference clique to which the different given set belongs.

2. The system of claim 1, wherein each interference clique denotes a respective group of the sets of cooperating remote antennas and wherein each set in the group either inflicts or undergoes interference from another set in the group that exceeds a threshold interference.

3. The system of claim 2, wherein each of the access points is configured to determine the respective collision loss probabilities and respective interference cliques based on measures of said interference that are included in said respective channel state information.

4. The system of claim 1, wherein each of the access points is configured to determine channel access probabilities for the sets of cooperating remote antennas in the cluster of the respective access point based on the respective sums of collision loss probabilities.

5. The system of claim 4, wherein each of the access points is configured to select one of the sets of cooperating remote antennas in the cluster of the respective access point to transmit a portion of said data to at least one of the receivers that is served by the selected set of cooperating remote antennas on a channel resource based on updates of the channel access probabilities of the sets of cooperating remote antennas in the cluster of the respective access point.

6. The system of claim 5, wherein said update for a corresponding set of the sets of cooperating remote antennas is based on a contention scheme between the sets of cooperating remote antennas.

7. The system of claim 6, wherein the cooperating remote antennas in the selected set transmit the same data simultaneously and wherein the respective access point is configured to jointly determine power allocation and precoding for the selected set.

8. A system for channel access adaptation, the system comprising:
    a cluster of remote antennas configured to transmit data to receivers and to obtain channel state information; and
    an access point configured to receive the channel state information from the remote antennas and adapt channel allocations to the remote antennas based on a tracking of sums of collision loss probabilities, wherein each given sum of the sums is determined by the access point for a different given set of a plurality of sets of cooperating remote antennas in the cluster and wherein each constituent collision loss probability in a given sum is determined by the access point from a different corresponding interference clique to which the different given set belongs.

9. The system of claim 8, wherein each interference clique denotes a respective group of the sets of cooperating remote antennas and wherein each set in the group either inflicts or undergoes interference from another set in the group that exceeds a threshold interference.

10. The system of claim 9, wherein the access point is configured to determine the collision loss probabilities and interference cliques based on measures of said interference that are included in said channel state information.

11. The system of claim 10, wherein the access point is configured to determine channel access probabilities for the sets of cooperating remote antennas in the cluster based on the sums of collision loss probabilities and wherein the access point is configured to select one of the sets of cooperating remote antennas in the cluster to transmit a portion of said data to at least one of the receivers that is served by the selected set of cooperating remote antennas on a channel resource based on updates of the channel access probabilities of the sets of cooperating remote antennas in the cluster.

12. The system of claim 11, wherein said update for a corresponding set of the sets of cooperating remote antennas is based on a contention scheme between the sets of cooperating remote antennas.

13. The system of claim 12, wherein the cooperating remote antennas in the selected set transmit the same data simultaneously and wherein the access point is configured to jointly determine power allocation and precoding for the selected set.

14. A method for channel access adaptation, the method comprising:
    receiving channel state information from a cluster of remote antennas;
    determining channel allocations for the remote antennas of the cluster based on a tracking of sums of collision loss probabilities, wherein each given sum of the sums is determined for a different given set of a plurality of sets of cooperating remote antennas in the cluster and wherein each constituent collision loss probability in a given sum is determined from a different corresponding interference clique to which the different given set belongs; and transmitting data from at least one of said sets of cooperating remote antennas in the cluster in accordance with the channel allocations.

15. The method of claim 14, wherein each interference clique denotes a respective group of the sets of cooperating remote antennas and wherein each set in the group either inflicts or undergoes interference from another set in the group that exceeds a threshold interference.

16. The method of claim 15, wherein the determining the channel allocations further comprises determining the collision loss probabilities and interference cliques based on measures of said interference that are included in said channel state information.

17. The method of claim 14, wherein the determining the channel allocations further comprises determining channel access probabilities for the sets of cooperating remote antennas in the cluster based on the sums of collision loss probabilities.

18. The method of claim 17, wherein the determining the channel allocations further comprises selecting one of the sets of cooperating remote antennas in the cluster to transmit a portion of said data to at least one receiver that is served by the selected set of cooperating remote antennas on a channel resource based on updates of the channel access probabilities of the sets of cooperating remote antennas in the cluster.

19. The method of claim 18, wherein said update for a corresponding set of the sets of cooperating remote antennas is based on a contention scheme between the sets of cooperating remote antennas.

20. The method of claim 19, wherein the cooperating remote antennas in the selected set transmit the same data simultaneously and wherein the method further comprises:

jointly determining power allocation and precoding for the selected set.

* * * * *